(12) United States Patent
Russell

(10) Patent No.: US 7,819,085 B2
(45) Date of Patent: Oct. 26, 2010

(54) CENTERLINE ANIMAL WEAVE TRAINING DEVICE AND METHOD

(76) Inventor: David L. Russell, 1811 Holston River Rd., Knoxville, TN (US) 37914-6142

( * ) Notice: Subject to any disclaimer, the term of this patent is extended or adjusted under 35 U.S.C. 154(b) by 348 days.

(21) Appl. No.: 12/018,560

(22) Filed: Jan. 23, 2008

(65) Prior Publication Data

US 2008/0173251 A1     Jul. 24, 2008

Related U.S. Application Data

(60) Provisional application No. 60/886,329, filed on Jan. 24, 2007.

(51) Int. Cl.
*A01K 15/02* (2006.01)
(52) U.S. Cl. .................. 119/705; 119/702; 119/703; 119/704
(58) Field of Classification Search .............. 119/702, 119/705, 703, 704, 712, 722, 738, 739, 743; 256/65.11, 65.12, 59; 403/331
See application file for complete search history.

(56) References Cited

U.S. PATENT DOCUMENTS 5,445,102 A * 8/1995 Rupp .................. 114/255
5,685,107 A * 11/1997 Sweet .................. 43/21.2
6,971,147 B2 * 12/2005 Halstead .................. 24/303

OTHER PUBLICATIONS http://web.archive.org/web/20061024041454/www.affordableagility.com/weavescomp.htm—Oct. 24, 2006.*
www.weybridgeagility.com—Dec. 25, 2005.*

* cited by examiner

*Primary Examiner*—Timothy D Collins
*Assistant Examiner*—Justin Benedik
(74) *Attorney, Agent, or Firm*—Knox Patents; Thomas A. Kulaga

(57) ABSTRACT

An apparatus for a weave trainer for demonstrating animal agility. In one embodiment, the weave trainer includes a rail with a set of adjustable poles. Attached to the rail are telescoping legs extending away from the centerline of the rail. The legs are grooved for engaging by a slider. Each slider engages one of the legs and includes a vertical projection that engages a pole. With the slider fully engaging the leg, the projection and pole are directly above the rail centerline. In one such embodiment, the legs are removable. In another embodiment, the angle of the projection is adjustable such that the engaged poles are movable to selected angles from vertical. In another embodiment, two rails are connected by a hinge that allows the two rails to fold.

17 Claims, 11 Drawing Sheets

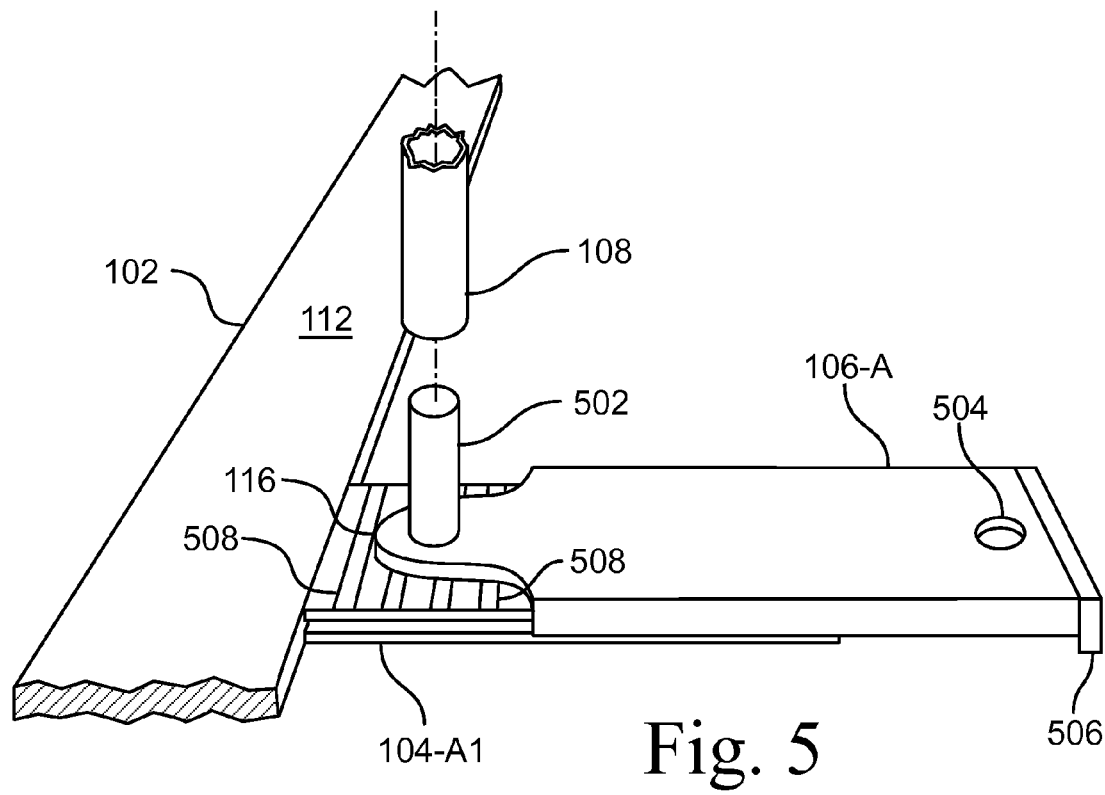
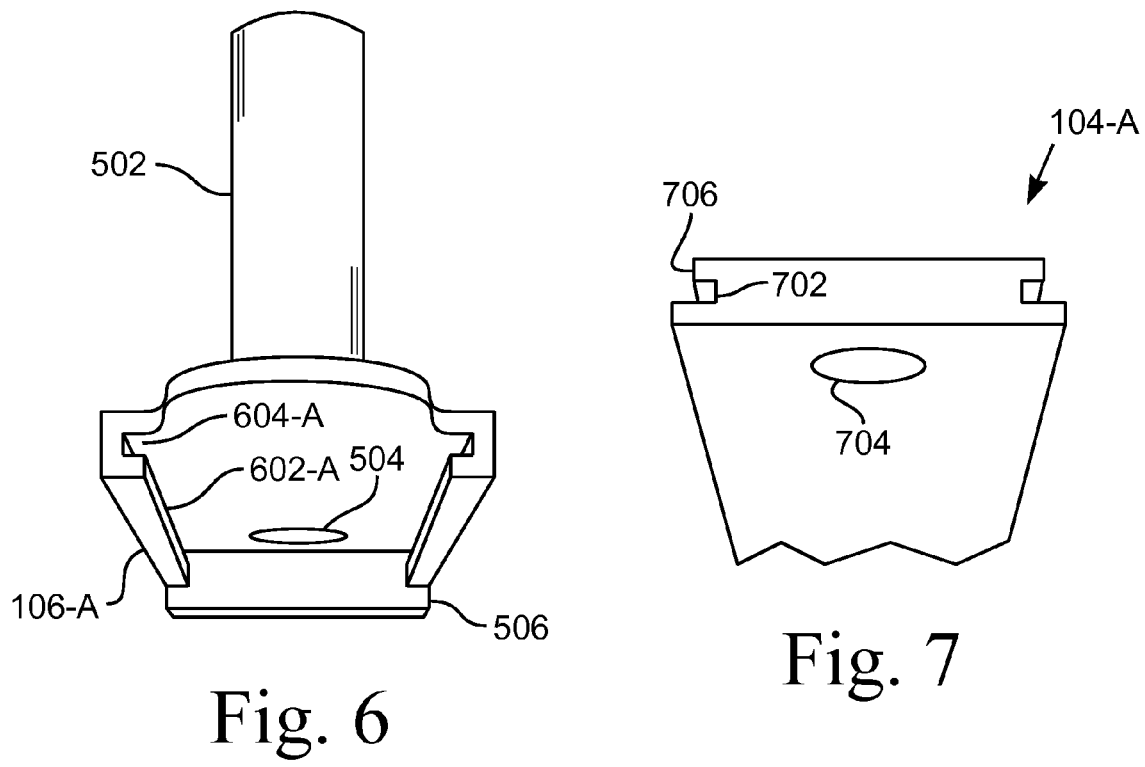

CENTERLINE ANIMAL WEAVE TRAINING DEVICE AND METHOD

CROSS-REFERENCE TO RELATED APPLICATIONS

This application claims the benefit of U.S. Provisional Application No. 60/886,329, filed Jan. 24, 2007.

STATEMENT REGARDING FEDERALLY SPONSORED RESEARCH OR DEVELOPMENT

Not Applicable

BACKGROUND OF THE INVENTION

1. Field of Invention

This invention pertains to a weave trainer for demonstration of animal agility. More particularly, in various embodiments, the weave trainer includes a set of adjustable poles that are movable away from the centerline of the rail with adjacent poles moving on opposite sides of the rail centerline, a pivot mechanism that allows for angular adjustment of the poles, legs for the rail that are removable from the rail, and/or a connector that joins two rails to make a longer trainer.

2. Description of the Related Art

Agility is the fastest growing dog sport in the USA. Numerous dog club events are sanctioned by such entities as the American Kennel Club, Inc. (AKC), the United States Dog Agility Association, Inc. (USDAA) and several other active organizations. Agility is also popular in many other parts of the world, especially Europe, where it was founded. In densely populated parts of the USA, exhibitors have a choice of agility trials within driving distance on virtually every weekend. Each trial averages several hundred dogs. There are numerous training facilities in every major metropolitan area. Regional, national and international competitions continue to spark an interest in the sport, and televised events are becoming more and more common.

Of all the obstacles required for successful dog agility competition, the most difficult to train and perform correctly is the weave poles. Even at the novice level, courses in most organizations contain a set of uniformly-spaced PVC poles (usually six), while more advanced levels mandate longer sets (usually twelve). The dog must enter the obstacle by passing between the first two poles from the right to the left, the next from left to right, and so on, continuing the alternating sequence for the full length of the set.

Equipment specifications are unique to each agility organization, and these specifications change from time to time. Many commonalities currently exist, and it is possible to manufacture a set that is suitable for regulation use by more than one organization. Some manufacturers offer a product choice that addresses these differences (e.g., spacing between poles) in order to support more rigorously the requirements of each organization.

A variety of different approaches to training weave poles has evolved since the sport first came to the USA in the 1980s. Some of these training approaches have led to modified designs for equipment that is practical for training, but not suitable for competition. Many manufacturers therefore offer two basic types of products: those for training weave pole skills and those that meet competition specifications.

BRIEF SUMMARY OF THE INVENTION

According to various embodiments of the present invention, a weave trainer is provided. In one embodiment, the weave trainer includes a rail with a set of independently adjustable poles. In one embodiment, the rail is a flat, rectangular elongated member. In another embodiment, the rail is made from channel stock. The top of the rail has a non-skid surface. Attached to the rail are alternating legs extending away from the centerline of the rail. The odd numbered legs are positioned on one side of the rail and the even numbered legs are positioned on the opposite side of the rail.

The legs are grooved for engaging by a slider. Each slider engages one of the legs and includes a projection that engages a weave pole that extends normal to the flat surface of the rail. The sliders slide along the legs, thereby allowing the selection of specific distances from the rail centerline to the pole. In one embodiment, the distal end of the slider has a downward projecting edge that has a bottom surface that is co-planar with the bottom surface of the rail.

With the slider fully engaging the leg, the projection and pole are directly above the rail centerline. When the projection and pole are directly above the rail centerline, the apparatus satisfies regulation equipment specifications for all major agility organizations. The slider is slideable along the leg to position the projection and pole away from the rail centerline. In one embodiment, the upper surface of the leg has one or more markings, or indicia, that allow the position of the slider along the leg to be known. In one embodiment, an opening in the slider is aligned with an opening in the leg when the slider fully engages the leg. The aligned openings receive a plug for covering the openings or a spike for securing the weave trainer to the ground.

In one embodiment, the vertical angle of the weave poles are adjustable by a pivot mechanism attached to the slider. The pivot mechanism allows the poles to be positioned at various angles through at least a 180 degree range where the external environment permits. Where the selected angle causes the weave pole to be in a vertical position, the configuration conforms to regulation equipment specifications for all major agility organizations. The pivot mechanism has an axle and a collar. The collar rotates about the axle. The position of the collar is fixed by tightening a stud through the collar against the axle. The stud is attached to a dowel on which a weave pole is secured. The rotation of the collar changes the angle of the weave pole. In one embodiment, the housing of the pivot mechanism has one or more markings, or indicia, that allow the angle of the pole with respect to the slider to be known. In other embodiments, the pivot mechanism is attached to the rail or the legs.

In one embodiment, the legs are attached to the rail at a joint that is separable. The separable joint does not require additional hardware or tooling to install or remove the legs. The legs have a ledge and a groove at the proximal end. When the rail is a channel with a base surface and two side surfaces, the rail has a window through a portion of the base surface and a side surface. The window receives the ledge under the base surface and the groove fits over the side wall such that the legs are secured.

In one embodiment, a hinge is attached to the one end of a rail. The hinge is also attached to one end of another rail. The hinge allows the two rails to fold together. Where the hinge connects rails made from channel stock, the folded rails form a cavity that permits storage of the removable legs.

A method of training an animal with the weave trainer is disclosed. The first step is to have the animal travel along the centerline of the rail when the sliders are positioned with the poles away from the centerline of the rail. The animal repeatedly travels along the centerline of the rail with the sliders positioned progressively inward to the retracted position, which moves the poles progressively closer to the centerline of the rail. The last training step is to have the animal follow a weaving path with the poles positioned over the rail centerline as oriented when demonstrating agility according to the regulations of all major agility organizations.

BRIEF DESCRIPTION OF THE SEVERAL VIEWS OF THE DRAWINGS

The above-mentioned features of the invention will become more clearly understood from the following detailed description of the invention read together with the drawings in which:

FIG. 5 is a partial perspective view of one embodiment of a leg and a slider;

FIG. 6 is a perspective view of the bottom of one embodiment of a slider;

FIG. 7 is a partial perspective view of one embodiment of a leg;

DETAILED DESCRIPTION OF THE INVENTION

An apparatus and method for weave training an animal is disclosed. Agility is a fast growing dog sport. One event for a dog agility competition is passage through a set of weave poles. This event requires the dog to follow a weaving path between a set of spaced parallel poles.

Figure 1:
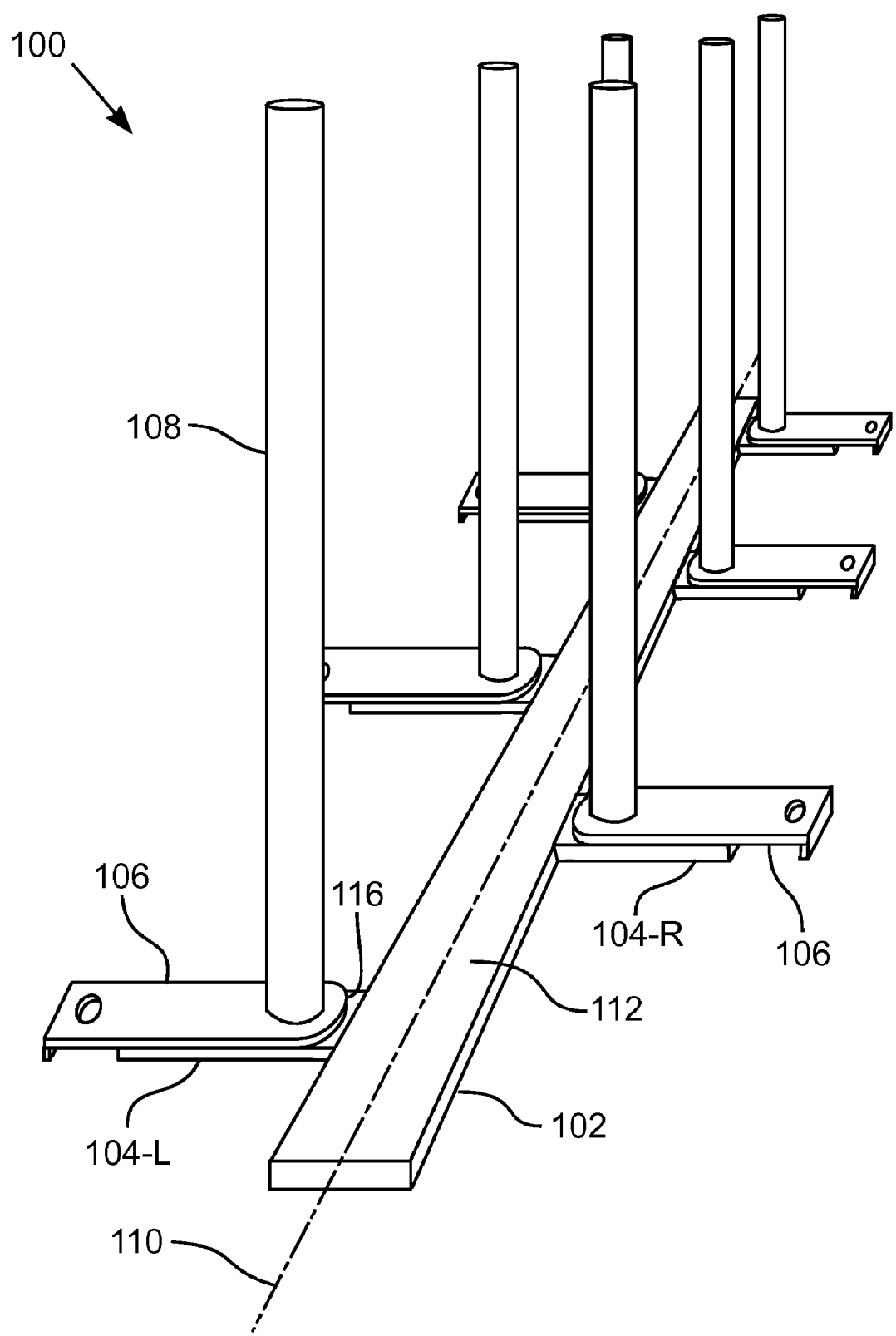
FIG. 1 is a perspective view of one embodiment of a weave trainer.

FIG. 1 illustrates a perspective view of one embodiment of a weave trainer 100. The weave trainer 100 includes a rail 102 that is an elongated, flat member. The top surface 112 of the rail 102 has a slip-resistant treatment, such as an etched surface or a non-skid paint or layer.

Extending from the rail 102 are legs 104 that alternate between opposite sides of the rail 102. In the illustrated embodiment, the first leg 104-L extends from the left side of the rail 102 and the second leg 104-R extends from the right side of the rail 102. The other legs 104 alternate in a like manner along the length of the rail 102.

Coupled to each leg 104 is a slider 106 that has a weave pole 108 extending upward from the proximal end 116 of the slider 106, which is nearest the centerline, or longitudinal axis, 110 of the rail 102. The sliders 106 slideably engage the legs 104 such that the distance of the poles 108 from the longitudinal axis 110 is adjustable.

Figure 2:
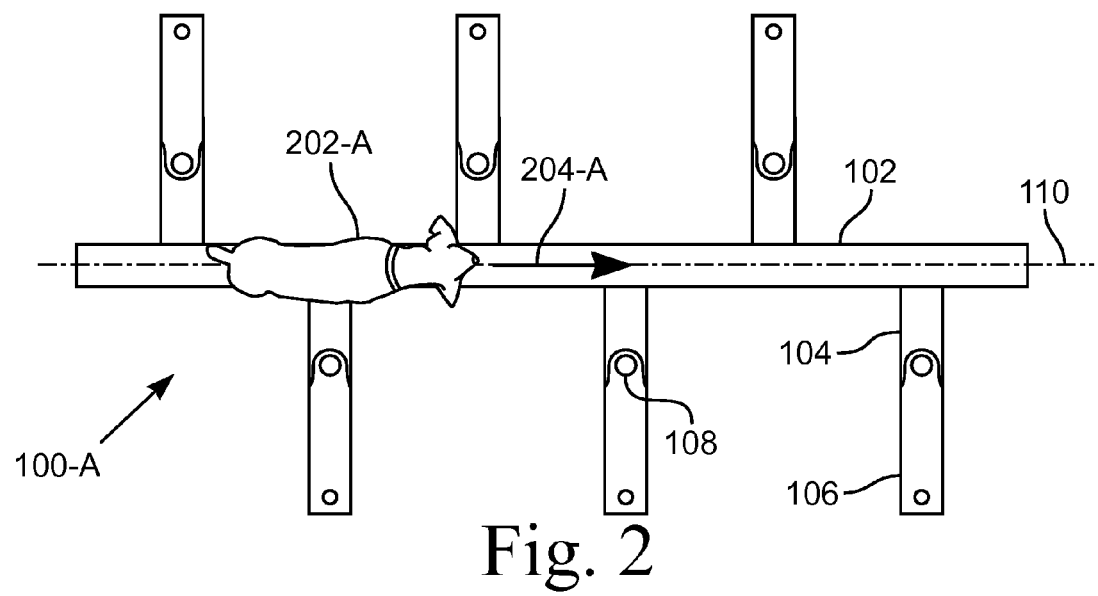
FIG. 2 is a top view of one embodiment of the weave trainer with the poles positioned such that a path is defined along the rail centerline.

FIG. 2 illustrates a top view of one embodiment of the weave trainer 100-A with the poles 108 positioned such that a path 204-A is defined parallel to and above the rail centerline 110. FIG. 2 illustrates an animal 202-A with its body aligned along the rail centerline 110 of the weave trainer 100 as the animal 202-A travels the path 204-A. In the illustrated configuration of the weave trainer 100-A, the sliders 106 carrying the poles 108 have been adjusted by sliding the sliders 106 along the legs 104 away from the rail centerline 110 such that the poles 108 are spaced away from the rail centerline 110 with a gap sufficient for the animal 202-A to pass along the rail centerline 110 without weaving.

FIG. 2 also illustrates an early step in the training method where the animal 202-A travels the path 204-A that follows the rail centerline 110 between the poles 108, which have been moved away from the centerline 110. In this step, the animal 202-A repeatedly traverses the weave trainer 100-A along the rail centerline 110. The animal 202-A becomes familiar with the weave trainer 100 and with moving between the poles 108 on alternating sides of the rail 102.

Figure 3:
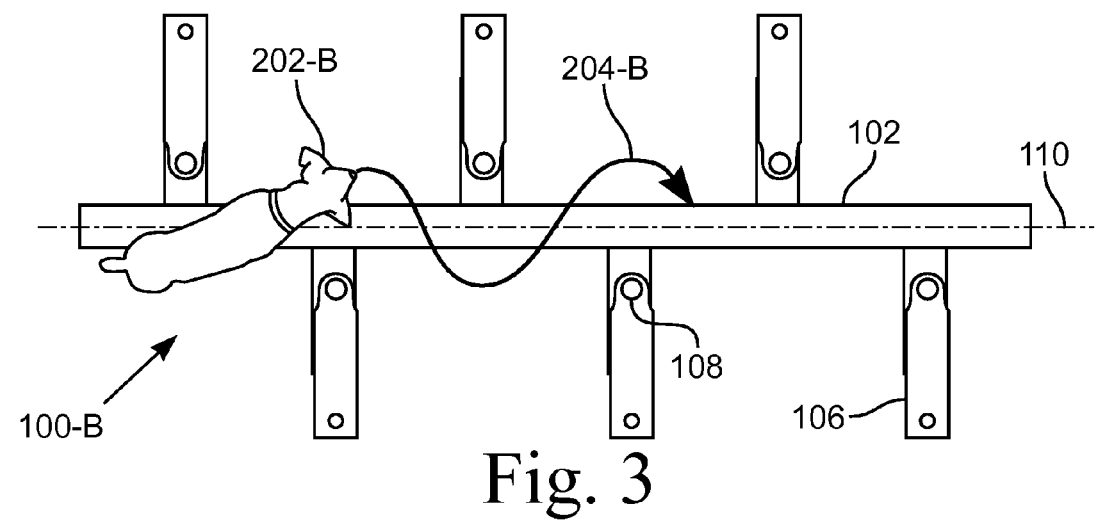
FIG. 3 is a top view of one embodiment of the weave trainer with the poles positioned such that a slightly weaving path is defined along the rail centerline.

FIG. 3 illustrates a top view of one embodiment of the weave trainer 100-B with the poles 108 positioned such that a slightly weaving path 204-B is defined along the rail centerline 110. The animal 202-B has its body slightly offset from being parallel with the rail centerline 110 as the animal 202-B travels the path 204-B. In the illustrated configuration of the weave trainer 100-B, the sliders 106 carrying the poles 108 have been adjusted by sliding the sliders 106 along the legs 104 away from the rail centerline 110 such that the poles 108 are spaced away from the rail centerline 110 with a gap sufficient for the animal 202-B to pass along the rail centerline 110 with a slight weaving.

FIG. 3 also illustrates a step in the training method following the step illustrated in FIG. 2. In this step, the animal 202-B travels the slightly weaving path 204-B between the poles 108, which have been moved slightly toward the rail centerline 110 relative to the configuration of the weave trainer 100-A illustrated in FIG. 2. In this step, the animal 202-B repeatedly traverses the weave trainer 100-B and the animal 202-B becomes familiar with following a slightly weaving path 204-B between the poles 108 on alternating sides of the rail 102.

Figure 4:
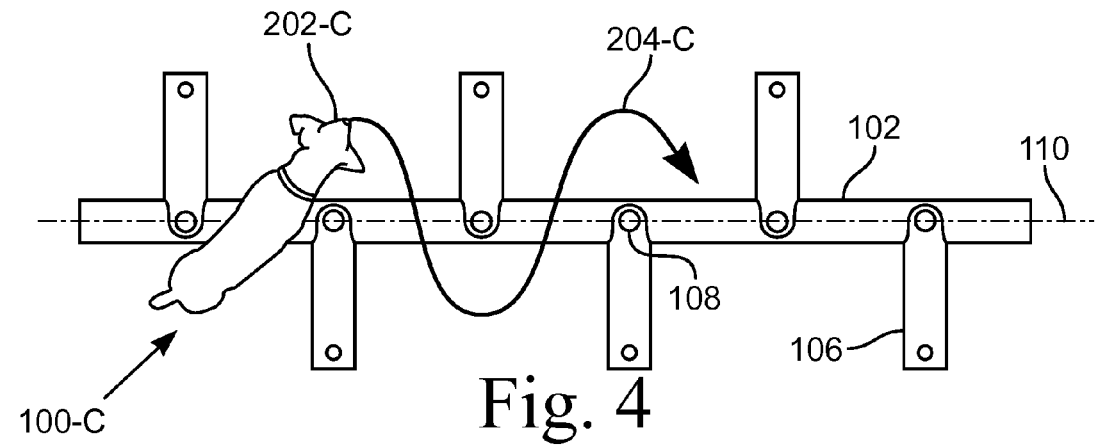
FIG. 4 is a top view of one embodiment of the weave trainer with the poles positioned above the rail centerline.

FIG. 4 illustrates a top view of one embodiment of the weave trainer 100-C with the poles 108 positioned above the rail centerline 110. The position of the poles 108 defines a weaving path 204-C along the rail centerline 110. The animal 202-C has its body significantly offset from being parallel with the rail centerline 110 as the animal 202-C travels the path 204-C. In the illustrated configuration of the weave trainer 100-C, the sliders 106 carrying the poles 108 have been adjusted by sliding the sliders 106 such that the poles 108 are above the rail centerline 110.

FIG. 4 also illustrates a step at the end of one embodiment on the training method. In this step the animal 202-C travels the weaving path 204-C around the poles 108 on the rail centerline 110. In this step, the animal 202-C travels the weaving path 204-C between the poles 108, which have been moved toward the rail centerline 110 from the configuration of the weave trainer 100-B illustrated in FIG. 3. In this step, the animal 202-C repeatedly traverses the weave trainer 100-C and the animal 202-C becomes familiar with traversing the weaving path 204-C between the poles 108.

FIGS. 2-4 illustrate the progression of steps in the training method, with the steps progressively training the animal 202 to traverse the weave trainer 100. The method of training includes the steps of having the animal 202-A follow a centerline path 204-A, followed by a step of having the animal 202-B follow a slightly weaving path 204-B, and followed by another step of having the animal 202-C traverse a weaving path 204-C. The position of the sliders 106 and the poles 108 for the middle step progressively moves from the configuration illustrated in FIG. 2 to the configuration illustrated in FIG. 4 as the animal 202 becomes familiar and comfortable with weaving between the poles 108. That is, the animal 202 repeated traverses a path 204 that progressively changes from a straight path 204-A to a weaving path 204-C.

Further, the rail 102 provides a visual cue to the animal 202. For the step illustrated in FIG. 2 where the animal 202-A travels a straight path 204-A, the rail provides a clear path for the animal 202-A to follow. For the steps where the animal 202-B, 202-C follows a weaving path 204-B, 204-C, the rail 102 provides indication of the general direction that the animal 202-B, 202-C is to travel. The constant presence of the rail 102 promotes learning the footwork required to traverse the weave trainer 100.

FIG. 5 illustrates a partial perspective view of one embodiment of a leg 104-A1 and a slider 106-A. FIG. 6 illustrates a perspective view of the bottom of one embodiment of a slider 106-A. FIG. 7 illustrates a perspective view of one embodiment of a leg 104-A1.

The illustrated embodiment of the slider 106-A includes a peg 502 extending upwards from the proximal end 116 of the slider 106-A. The peg 502 is a cylindrical member. The weave pole 108 is a hollow tube, such as a section of PVC pipe, that slides over and engages the peg 502. The proximal end 116 of the slider 106-A is contoured to minimize the surface of the slider 106-A that is exposed when the pole 108 is placed over the peg 502. By minimizing the exposure of the slider 106-A at the proximal end 116, there is less likelihood that the animal 202 will step on or otherwise be affected by the slider 106-A.

At the distal end of the slider 106-A is a stake hole 504 and an end plate 506. The stake hole 504 is dimensioned and configured to receive a stake to secure the slider 106-A to the ground in a fixed position relative to the rail 102. The end plate 506 extends below the tongue 602-A of the slider 106-A a distance such that the bottom of the end plate 506 is coplanar with the bottom surface of the rail 102. The end plate 506 supports the distal end of the slider 106-A when the slider 106-A is extended away from the rail centerline 110, such as illustrated in FIG. 2.

The leg 104-A1 is attached to the side of the rail 102 and extends away from the rail 102 perpendicular to the rail centerline 110. In various embodiments, the leg 104-A1 is permanently attached to the rail 102 or removably attached. The thickness of the leg 104-A1 is the same as the thickness of the rail 102; therefore, the bottom of the leg 104-C is coplanar with the bottom of the rail 102. The leg 104-A1 has a flat upper surface with markings 508 parallel with the rail centerline 110. The markings 508 are indicia of the distance the slider 106-A is extended away from the rail centerline 110. For example, when the proximal ends 116 of the sliders 106-A are all aligned with the same corresponding mark 508, the indication is that all the sliders 106-A are extended an equal distance and the poles 108 on each side of the rail 102 are coplanar. In various embodiments, the marks 508 are etched, engraved, or painted on the surface of the leg 104-A1 or are formed of strips of material affixed to the top of the leg 104-A1.

The distal end of the leg 104-A1 includes an opening 704 that registers with the stake hole 504 in the slider 106-A when the slider 106-A fully engages the leg 104-A1, that is, when the pole 108 is aligned with the rail centerline 110. When the opening 704 and the stake hole 504 are aligned, a stake fits into the pair of holes 504, 704. Also, when the slider 106-A is extended such that the stake hole 504 is past the end of the leg 104-A1, the stake clears the leg 104-A1 when inserted through the stake hole 504.

On each side of the leg 104-A1 is a slot 702 that engages the tongue 602-A of the slider 106-A. Above each slot 702 in the leg 104-A1 is a lip 706 that engages a groove 604-A in the slider 106-A. The tongue-and-groove configuration of the slider 106-A and leg 104-A1 secures the two 104-A1, 106-A such that the slider 106-A is able to move only to extend and retract. The tongue-and-groove configuration of the slider 106-A and leg 104-A1 allows for quick and repeated repositioning of the poles 108 by moving the slider 106-A along the leg 104-A1.

Figure 8:
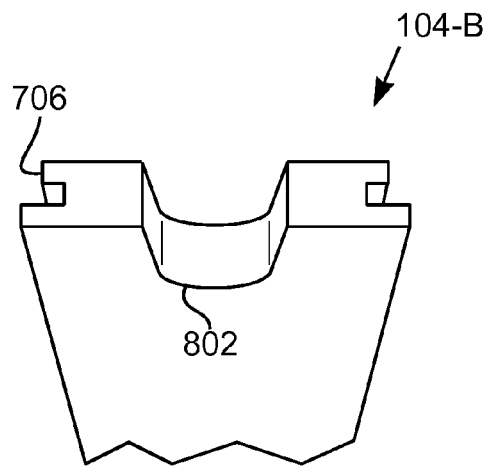
FIG. 8 is a partial perspective view of another embodiment of a leg.

FIG. 8 illustrates a partial perspective view of another embodiment of a leg 104-B. In the illustrated embodiment, the opening 802 at the distal end of the leg 104-B has a U-shape. The U-shaped opening 802 allows a stake inserted in the stake hole 504 in the slider 106 to pass by the leg 104-B when the slider 106 is in a fully retracted or almost fully retracted position.

Figure 9:
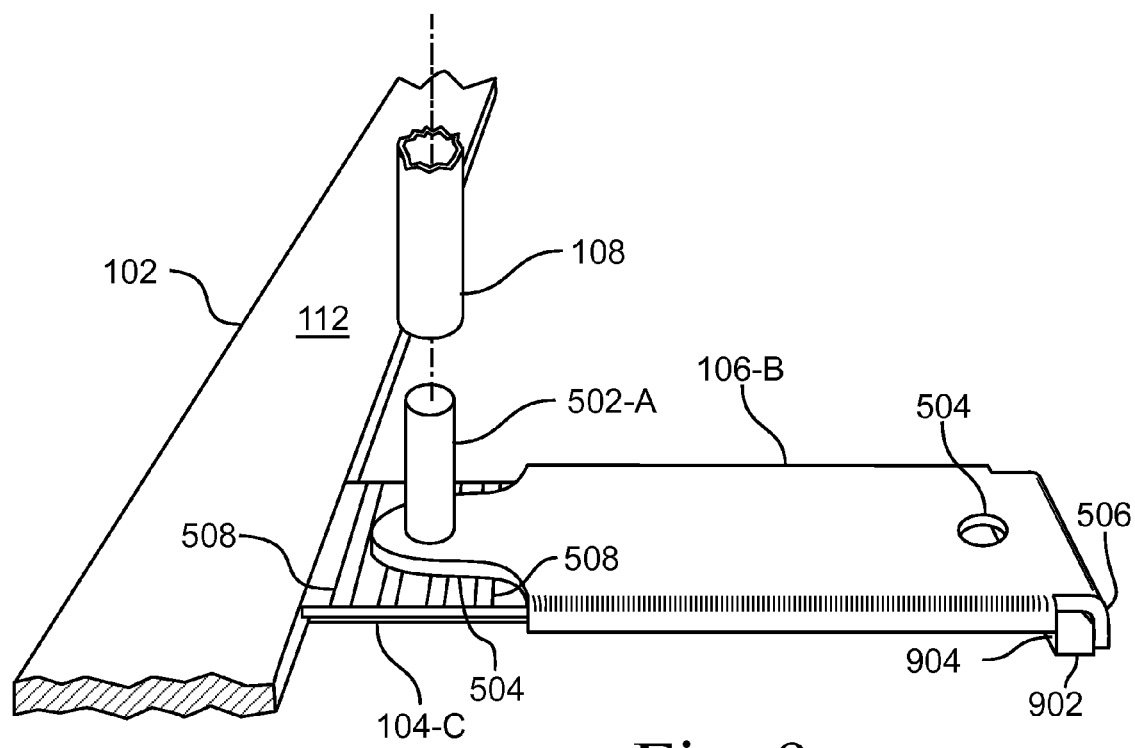
FIG. 9 is a partial perspective view of another embodiment of a leg and slider.
Figure 10:
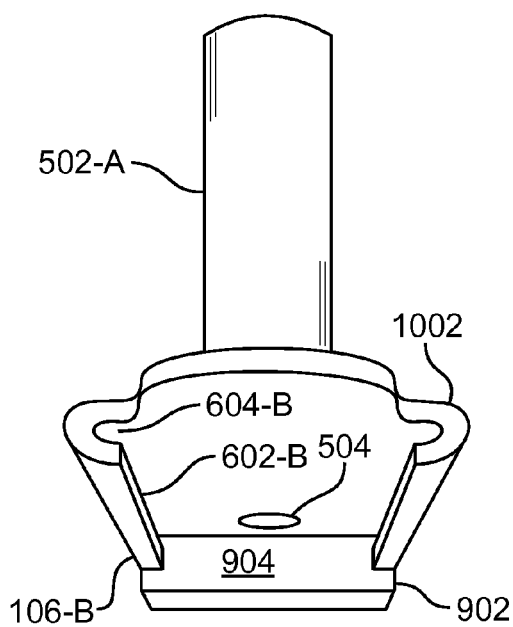
FIG. 10 is a perspective view of the bottom of another embodiment of a slider.
Figure 11:
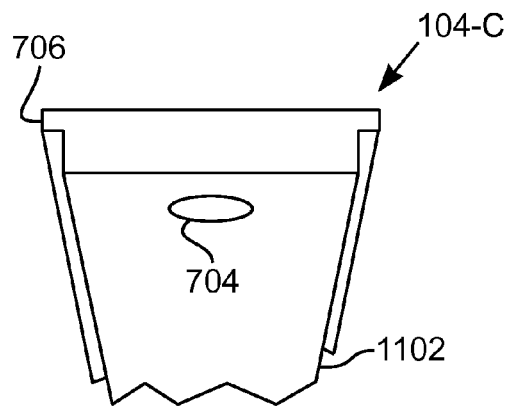
FIG. 11 is a partial perspective view of another embodiment of a leg.

FIG. 9 illustrates a partial perspective view of another embodiment of a leg 104-C and slider 106-B. FIG. 10 illustrates a perspective view of the bottom of another embodiment of a slider 106-B. FIG. 11 illustrates a partial perspective view of another embodiment of a leg 104-C.

In the illustrated embodiment, the slider 106-B includes a sheet of material bent to form a portion of the slider 106-B. The distal end of the slider 106-B has the end wall 506 formed by bending the distal end of the slider 106-B downward. The side walls 1002 of the slider 106-B are curved to form a groove 604-B. Between the end wall 506 and the slider side walls 1002 is a block 902 with forward face 904. When the slider 106-B is fully retracted, the forward face 904 of the block 902 contacts the distal end of the leg 104-C. In one embodiment, the block 902 is a hard plastic such as nylon or an ultra high molecular weight (UHMW) polyethylene. In such an embodiment, the block 902 has some resilience and impact strength to soften and withstand the shock of the slider 106-B repeated striking the distal end of the leg 104-C when the slider 106-B is pushed to the retracted position. Also, the bottom of the plastic block 902 provides a smooth flat surface for sliding along the ground when the slider 106-B is moved between the retracted and extended positions. The block 902 is wider in the direction of movement of the slider 106-B than the end wall 506 of the embodiment illustrated in FIG. 5. In another embodiment, the edges of the block 902 that are perpendicular to the direction of travel of the slider 106-B are rounded to avoid the block 902 catching or digging into the ground when the slider 106-B is moved.

In the illustrated embodiment of the slider 106-B, the side walls 1002 are curved to form a tongue 602-B and a groove 604-B. The leg 104-C has a lip 706 extending to the sides above a block portion 1102 of the leg 104-C. The thickness of the leg 104-C is the same as the thickness of the rail 102; therefore, the bottom of the block portion 1102 of the leg 104-C is coplanar with the bottom of the rail 102. The lip 706 of the leg 104-C engages the groove 604-B of the slider 106-B and thereby slideably secures the slider 106-B to the leg 104-C.

Figure 13:
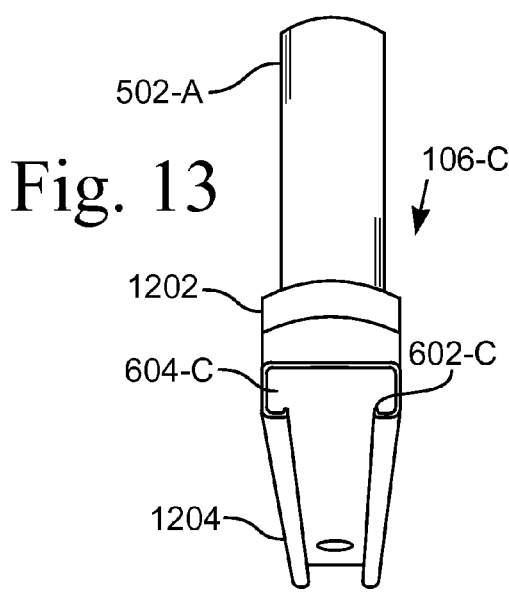
FIG. 13 is a perspective view of the bottom of the slider shown in FIG. 12.
Figure 12:
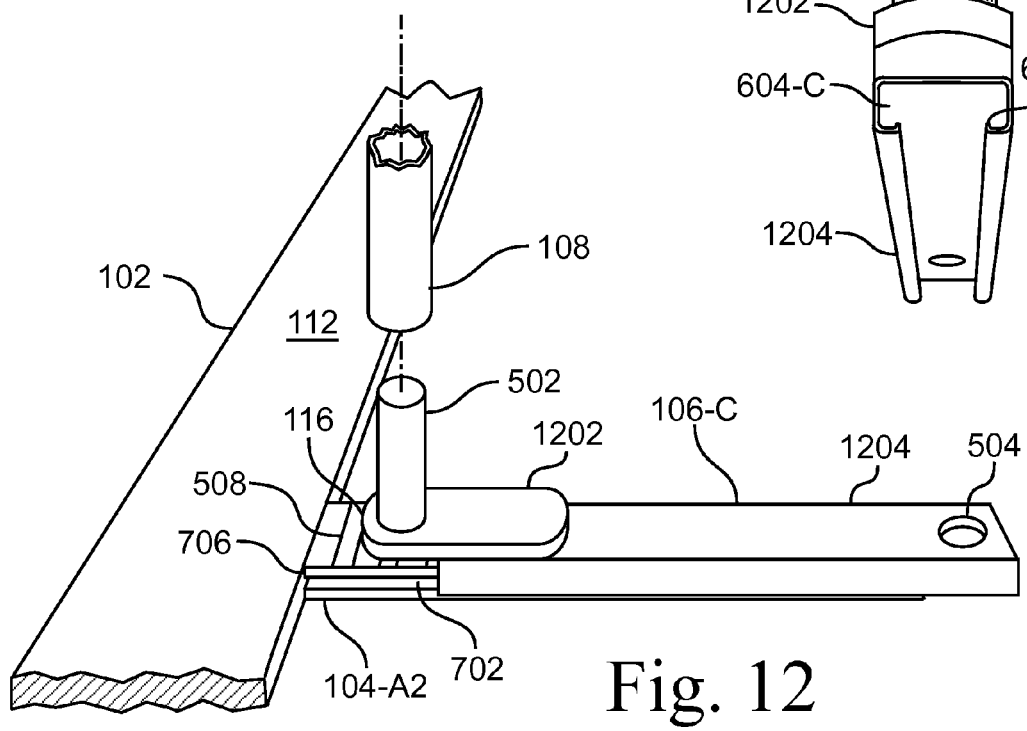
FIG. 12 is a partial perspective view of another embodiment of a slider.

FIG. 12 illustrates a partial perspective view of another embodiment of a slider 106-C. FIG. 13 illustrates a perspective view of the bottom of the slider 106-C shown in FIG. 12.

In the illustrated embodiment, the slider 106-C includes a slider plate 1202, a peg 502, and a slider channel 1204. The slider plate 1202 is a flat plate with rounded ends that connects the peg 502 to the slider channel 1204. The peg 502 is attached to and extends upwards from the end 116 of the slider plate 1202 proximal to the rail 102. The width of the slider plate 1202 is minimized such that only a small ledge is provided for the placement of a pole 108 over the peg 502. By minimizing the exposure of the slider plate 1202 at the proximal end 116, there is less likelihood that the animal 202 will step on or otherwise be affected by the slider plate 1202.

The slider channel 1204 includes a curved edge or tongue 602-C and a groove 604-C. On each side of the leg 104-A2 is a slot 702 that engages the tongue 602-C of the slider channel 1204. Above each slot 702 in the leg 104-A2 is a lip 706 that engages a groove 604-C in the slider channel 1204. The tongue-and-groove configuration of the slider channel 1204 and leg 104-A2 secures the two 104-A2, 1204 such that the slider channel 1204 is able to move only to extend and retract.

In the illustrated embodiment, the slider plate 1202 and peg 502 are cantilevered where they are attached to the slider channel 1204 such that the proximal end 116 of the slider plate 1202 becomes the proximal end 116 of the slider 106-C. In other embodiments, the peg 502 is attached directly to the slider channel 1204. The tongue-and-groove configuration of the slider 106-C and leg 104-A2 allows for quick and repeated repositioning of the poles 108 by moving the slider 106-C along the leg 104-A2. The slider 106-C allows a portion of the slider plate 1202 to extend over the rail 102 and locate the pole 108 over the rail centerline 110.

Figure 14:
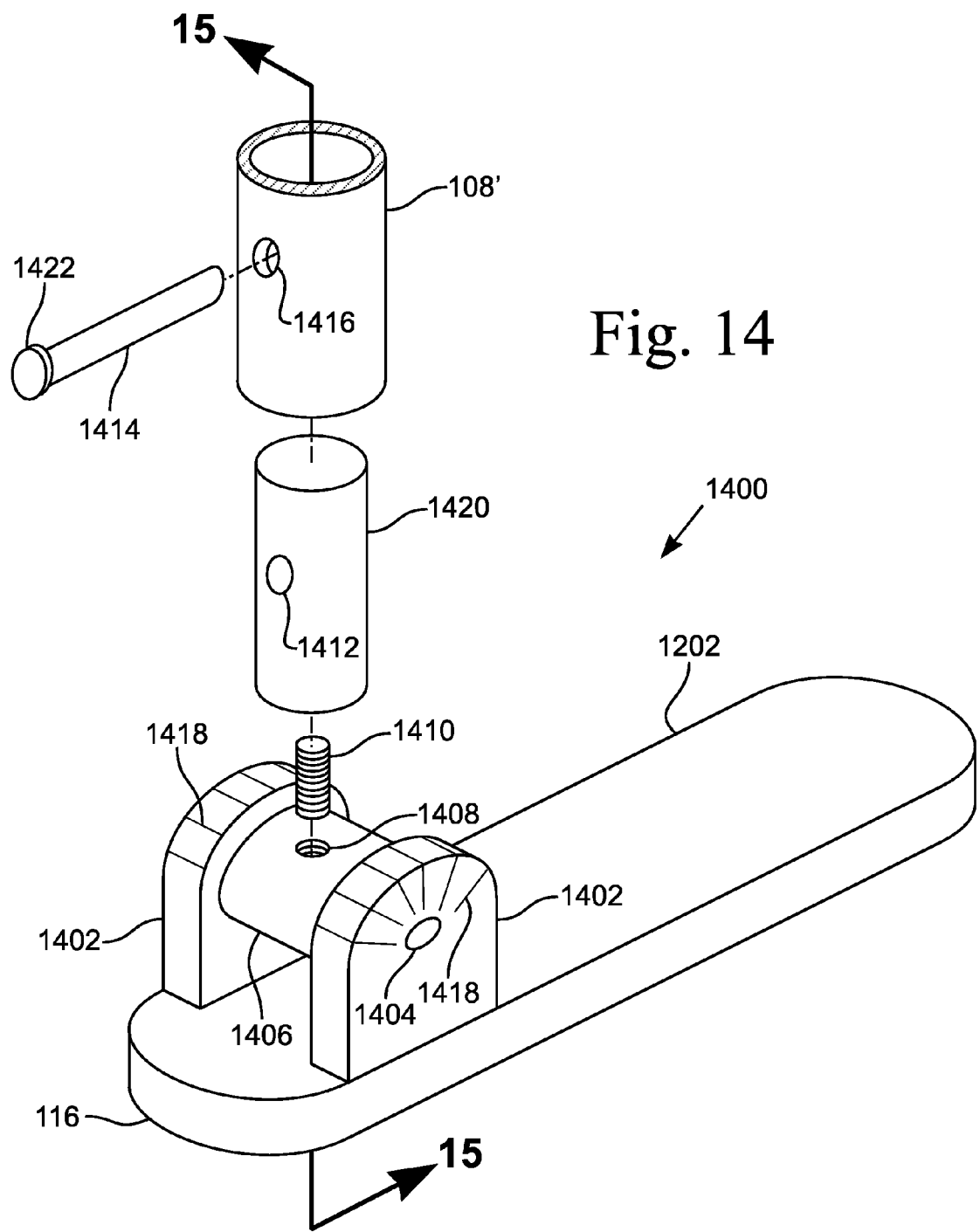
FIG. 14 is an exploded perspective view of one embodiment of a pivot mechanism.
Figure 15:
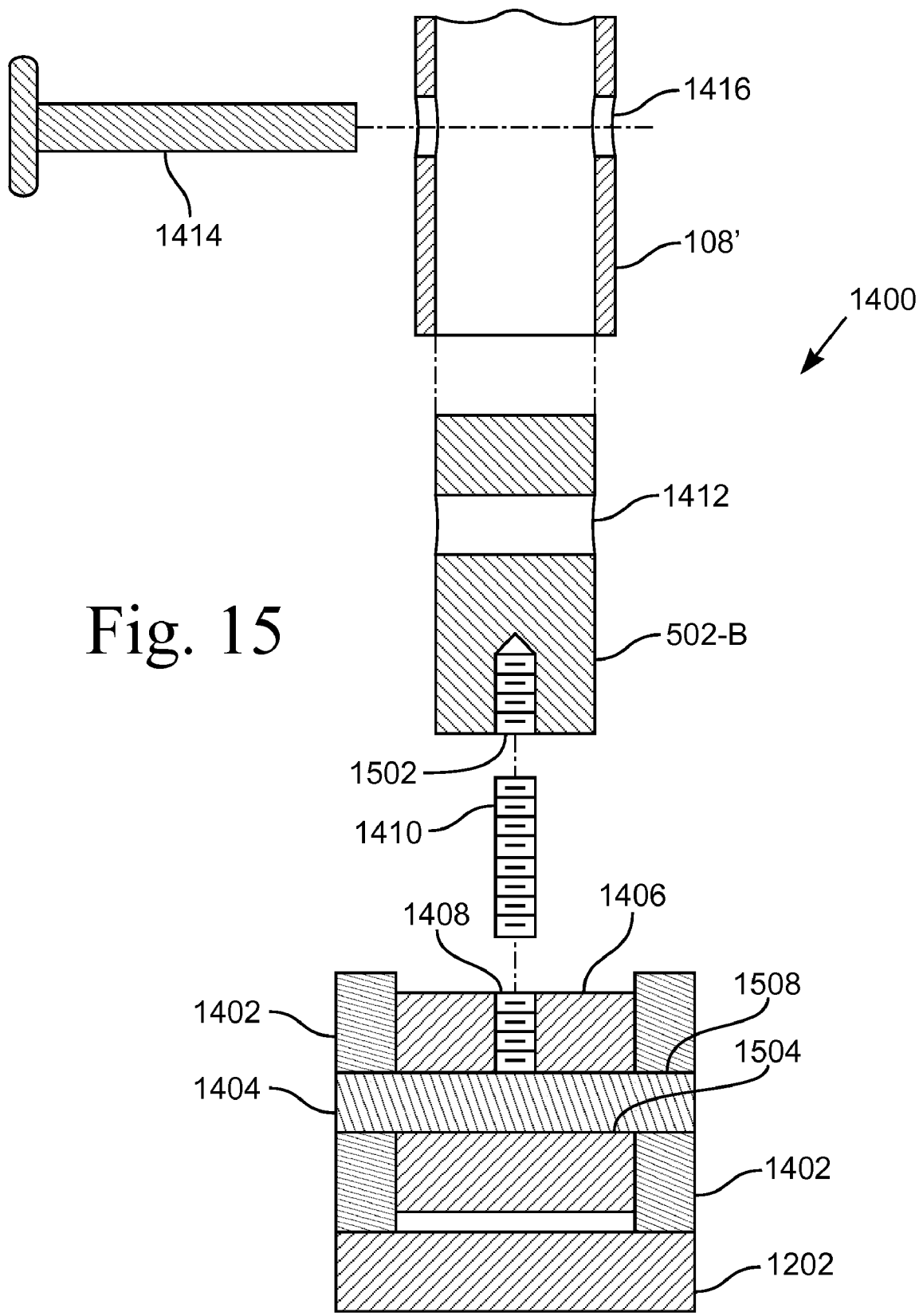
FIG. 15 is an exploded front view of the pivot mechanism shown in FIG. 14.

FIG. 14 illustrates an exploded perspective view of one embodiment of a pivot mechanism 1400. FIG. 15 illustrates an exploded front view of the pivot mechanism 1400 shown in FIG. 14.

The pivot mechanism 1400 includes an axle 1404 and a collar 1406. The axle 1404 is supported by two bearing walls 1402. The bearing walls 1402 are attached to and extend upwards from the proximal end 116 of a slider plate 1202. The bearing walls 1402 are parallel to each other. The longitudinal axis of the axle 1404 is perpendicular to the longitudinal axis of the slider plate 1202. In the illustrated embodiment, the axle 1404 is secured in an axle hole 1508 in each of the bearing walls 1402 and terminates flush with the outside surfaces of the bearing walls 1402. In various embodiments, the axle 1404 is attached to the bearing walls 1402 by welding the ends of the axle 1404 to the bearing walls 1402 or by applying an adhesive to the axle 1404 and axle hole 1508 interface or by other means commonly known in the art. In the illustrated embodiment, the pivot mechanism 1400 is attached to a slider plate 1202. In other embodiments, the pivot mechanism 1400 is attached to a rail 102 or to a leg 104 or to a slider 106 or to another surface.

The bearing walls 1402 are separated a distance slightly greater than the width of the collar 1406. The collar 1406 is a thick-walled cylinder. A hole 1504 passes through the central axis of the collar 1406. The hole 1504 receives the axle 1404 such that the collar 1406 rotates about the axle 1404. The hole 1504 is dimensioned so that the movement of the collar 1406 about the axle 1404 is substantially rotational. The collar 1406 has a threaded through-hole 1408 that provides access to the axle 1404 by a stud 1410. In the illustrated embodiment, the through-hole 1408 has a longitudinal axis that is perpendicular to and intersects the axis of rotation of the collar 1406.

Each bearing wall 1402 extends upward from the slider plate 1202 and has a full radius at the top. In the illustrated embodiment, the radius at the top of the bearing wall 1402 is larger than and concentric with the outside surface of the collar 1406. In another embodiment, the radius at the top of the bearing wall 1402 is the same size as the outside surface of the collar 1406. In various other embodiments, the shape of the top of the bearing wall 1402 is not a full radius, but has sharp corners, or is not concentric with the outside surface of the collar 1406, or is otherwise different than the outside surface of the collar 1406. The axle 1404 holds the collar 1406 above the surface of the slider plate 1202.

In the illustrated embodiment, the pivot mechanism 1400 includes a dowel 1420 and a stud 1410. The dowel 1420 is a cylindrical member with a threaded hole 1502 in one end. The longitudinal axis of the threaded hole 1502 is coaxial to the longitudinal axis of the dowel 1420. The threaded hole 1502 receives the stud 1410. The stud 1410 is a threaded fastener. One end of the stud 1410 is fixedly installed into the threaded hole 1502 of the dowel 1420. With the stud 1410 installed, the dowel 1420 acts as a head for the portion of the threaded stud 1410 extending from the dowel 1420. In various embodiments, the dowel and stud are one piece or the stud is welded or glued or otherwise affixed to the dowel.

With the stud 1410 fixed in the end of the dowel 1420, the stud 1410 is threaded into the through-hole 1408 of the collar 1406 by turning the dowel 1420 clockwise. The collar 1406 is fixed in a position by turning the dowel 1420 until the other end of the threaded stud 1410 makes contact with the axle 1404 and is tightened against the axle 1404. The collar 1406 is released from the set position by turning the dowel 1420 counter-clockwise until the other end of the threaded stud 1410 is free of contact with the axle 1404. When the collar 1406 is released from the set position and the stud 1410 remains threaded into the through-hole 1408, the dowel 1420 rotates about the axle 1404 to a desired position.

The collar 1406 and stud 1410 are a clamp with the stud 1410 providing the clamping force that secures the clamp to the axle 1404. Tightening the stud 1410 against the axle 1404 forces the inside surface of the collar 1406 opposite the through-hole 1408 against the axle 1404, thereby clamping the axle 1404.

The dowel 1420 has a through-hole 1412 passing through the cylindrical surface that is perpendicular to the longitudinal axis. A weave pole 108' is secured to the pivot mechanism 1400 by a pin 1414. The pole 108' has a pair of coaxial pin holes 1416. The pin holes 1416 pass through the walls of the pole 108'. The pin holes 1416 are perpendicular to and intersect the longitudinal axis of the pole 108'.

The weave pole 108' is secured to the pivot mechanism 1400 by positioning the weave pole 108' over the dowel 1420 such that the pin holes 1416 of the pole 108' register with the through-hole 1412 of the dowel 1420. The pin 1414 fits through the holes 1416, 1412, thereby securing the weave pole 108' to the dowel 1420. To loosen and secure the collar 1406 about the axle 1404, the pole 108' turns the stud 1410. When the collar 1406 is loosened, the angle of the pole 108' is adjustable. In the illustrated embodiment, the pin 1414 has a cylindrical body and a head 1422 contoured to the shape of the pole 108'. In various embodiments, the pin 1414 may be a cotter pin, clevis pin, detent pin, cotterless clevis pin, headless pin, or other fastener so long as the shape of the pin 1414 and the head 1422, if present, pose a minimal threat to the animal 202 or the hazardous part of the pin 1414 is shielded. Hazards from the pin 1414 configuration include snagging the fur or scraping the leg or foot of the animal 202.

Each bearing wall 1402 is marked with indicia 1418 to indicate the angular position of the pole 108'. In one embodiment, the indicia 1418 is aligned with the center of a pole 108'. When a pole 108' is positioned at an indicia 1418 on the bearing walls 1402, the angular position of the pole 108' is known. When each of the poles 108' on one side of a weave trainer 100 are positioned to the same corresponding indicia 1418 on the bearing walls 1402, the position of the poles 108' on that side of the weave trainer 100 are uniform.

Figure 16:
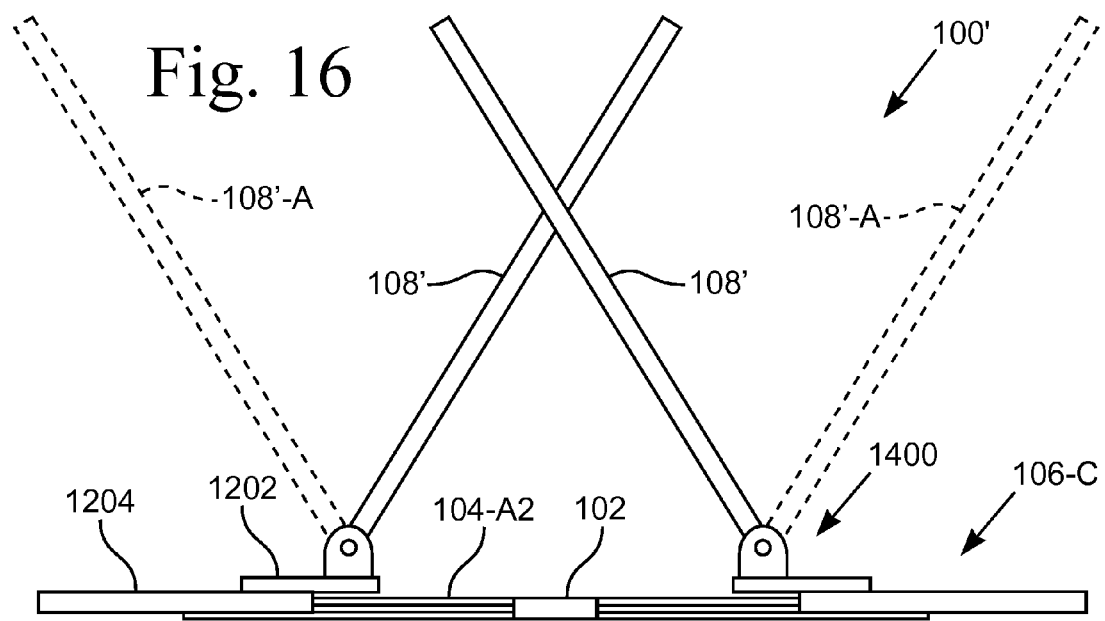
FIG. 16 is a front view of another embodiment of a weave trainer.

FIG. 16 illustrates a front view of another embodiment of a weave trainer 100'. In the illustrated embodiment, the poles 108' are positioned at an angle to accommodate various weave training methods. The pivot mechanism 1400 allows the angle of the weave poles 108' to be adjusted in a plane perpendicular to the longitudinal axis 110 of the rail 102. The animal 202 uses the angled poles 108' as a visual and tactile guide to learn in what order and on what side the animal 202 is to pass the poles 108' when traversing the weave to demonstrate its agility. The illustrated configuration supports the training method where the animal 202 walks along the rail 102 through the triangular opening by ducking below each angled pole 108' along the way. The side of the pole 108' that the animal 202 ducks under is the same side of the pole 108' that the animal 202 passes when traversing the rail 102 in a demonstration of agility. Although the illustrated embodiment shows the pivot mechanism 1400 attached to a leg 104-A2 as illustrated in FIGS. 12 and 13, in other embodiments, the weave trainer 100' includes pivot mechanisms 1400 attached to other embodiments of the leg 104.

FIG. 16 also illustrates a configuration of the weave poles 108'-A (shown in dashed lines). The poles 108'-A are angled outwards away from the rail 102. The poles 108'-A assume a truncated V-shape. The animal traverses the weave trainer 100' through a passage with the poles 108'-A angled away from the animal's body.

Figure 17:
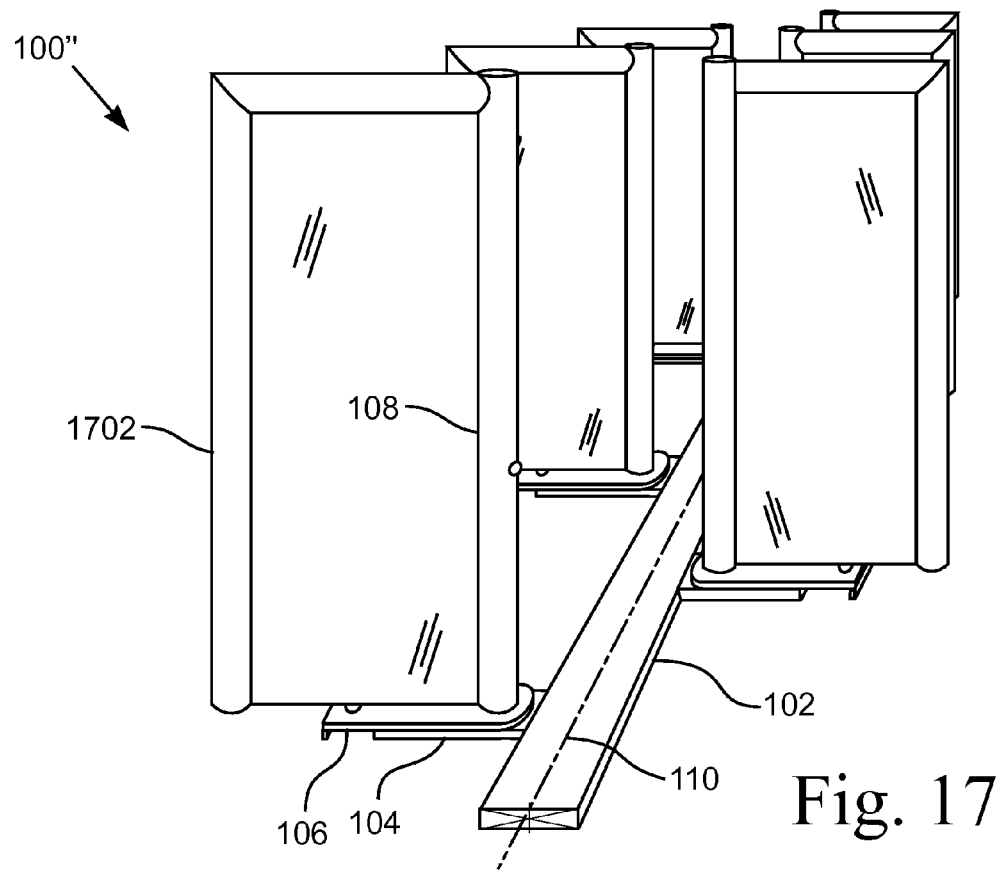
FIG. 17 is a perspective view of another embodiment of a weave trainer.

FIG. 17 illustrates a perspective view of another embodiment of a weave trainer 100". In the illustrated embodiment, the poles 108 form one side of a gate 1702. The gates 1702 extend away from the rail centerline 110. The animal 202 uses the gates 1702 as visual and physical barriers when learning to traverse the various weaving paths 204 of the weave trainer 100". In one embodiment, the poles 108 are restrained from rotating relative to the sliders 106, thereby ensuring the proper orientation of the gates 1702 to the rail centerline 110.

Figure 18:
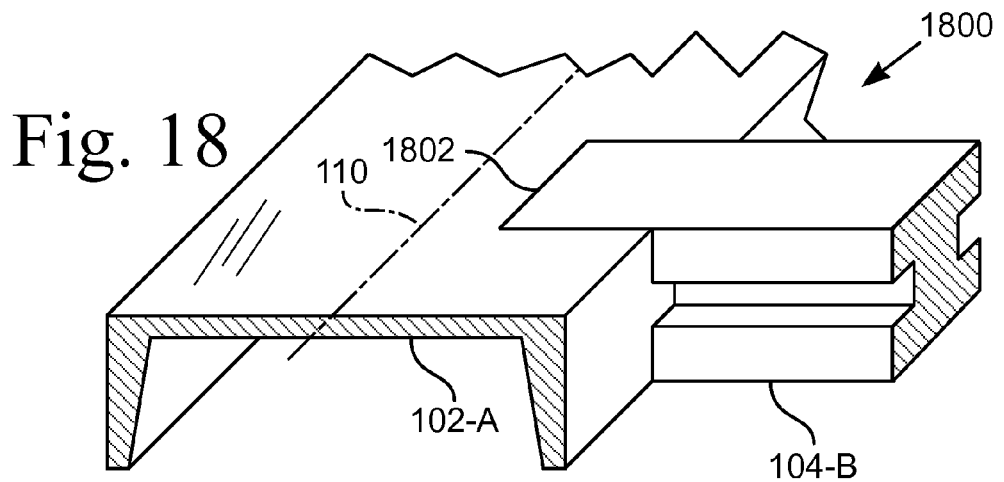
FIG. 18 is a partial perspective view of one embodiment of a joint between a rail and a leg.
Figure 19:
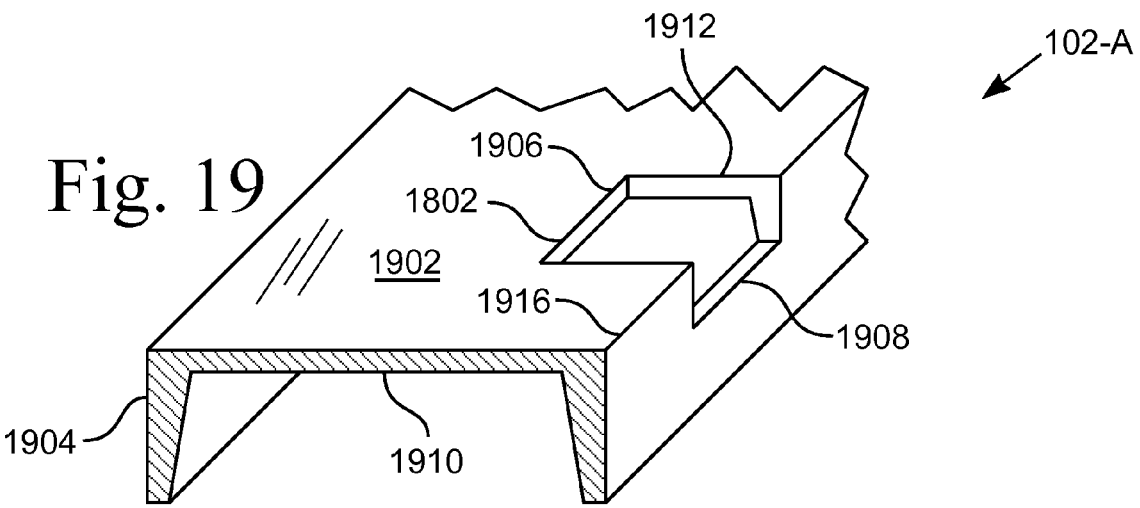
FIG. 19 is a partial perspective view of the rail shown in FIG. 18.
Figure 20:
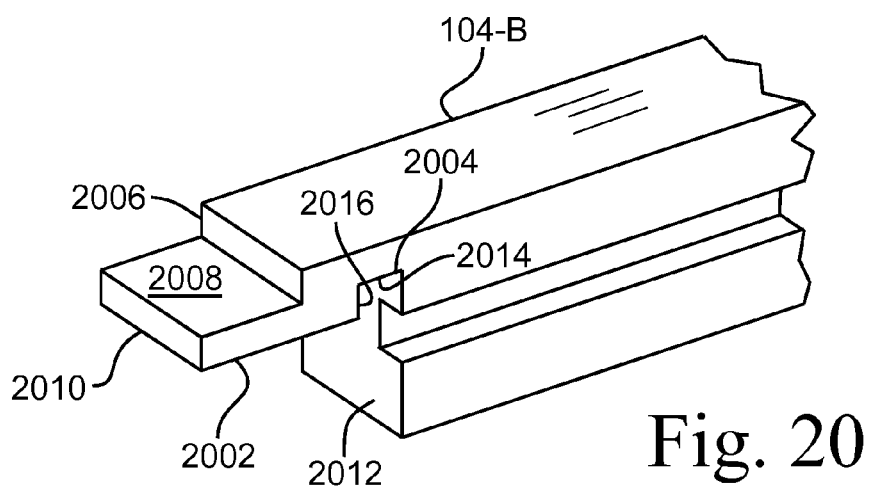
FIG. 20 is a partial perspective view of the leg shown in FIG. 18.

FIG. 18 illustrates a partial perspective view of one embodiment of a joint 1800 between a rail 102-A and a leg 104-B. FIG. 19 illustrates a partial perspective view of the rail 102-A shown in FIG. 18. FIG. 20 illustrates a partial perspective view of the leg 104-B shown in FIG. 18.

The rail 102-A is a channel with a base wall 1902 and two side walls 1904. The base wall 1902 has an inside face, or surface, 1910 that defines the lower extent of the base wall 1902. The side walls 1904 attach to the base wall 1902 at corners 1916 that run the length of the rail 102-A. The rail 102-A has a window 1802 in a corner 1916 where a leg 104-B connects with the rail 102-A. In the illustrated embodiment, the window 1802 passes through the entire thickness of the base wall 1902 and the side wall 1904. The window 1802 has a length defined by two parallel faces 1912 that lie in planes that are perpendicular to the longitudinal axis 110 of the rail 102-A.

The window 1802 is further defined by a bearing face 1908 and a stop 1906. The bearing face 1908 is a planar surface that is the top of the side wall 1904. The stop 1906 is a planar surface adjacent to the base wall 1902. The bearing face 1908 and stop 1906 are perpendicular to their respective adjacent walls 1904, 1902. The bearing face 1908 and the stop 1906 are perpendicular to and join the two parallel faces 1912.

The leg 104-B has a ledge 2002 that extends outward at the rail end of the leg 104-B. The ledge 2002 has a forward face 2010. The forward face 2010 of the ledge 2002 is at the proximal end of the leg 104-B. In the illustrated embodiment, the forward face 2010 is a planar surface in a plane perpendicular to the longitudinal axis of the leg 104-B. In various embodiments, the forward face 2010 is rounded or chamfered or another shape or at another angle that is readily insertable into the window 1802.

The ledge 2002 has a mating face 2008. The mating face 2008 is a planar surface along the top side of the ledge 2002. The mating face 2008 is parallel to the upper surface of the leg 104-B. The mating face 2008 is offset below the upper surface of the leg 104-B by approximately the thickness of the base wall 1902 of the rail 102-A. The transition between the upper surface of the leg 104-B and the ledge 2002 is defined by a shoulder 2006. The shoulder 2006 is a planar wall perpendicular to the mating face 2008.

The lower surface 2002 of the ledge 2008 is offset above the lower surface of the leg 104-B. The lower surface 2002 of the ledge 2008 extends from a slot 2004 to the forward face 2010 of the ledge 2008. The slot 2004 is defined by two parallel walls 2012, 2016 and an interior face 2014. One of the parallel walls 2012 extends upward into the leg 104-B from the lower surface of the leg 104-B. The other parallel wall 2016 extends upward into the leg 104-B from the lower surface of the ledge 2008. The interior face 2014 is a planar surface oriented perpendicular to the two parallel walls 2012, 2016.

The leg 104-B is removably attachable to the rail 102-A by inserting the ledge 2008 into the window 1802 and positioning the bearing face 1908 of the sidewall 1904 inside the slot 2004. The window 1802 in the rail 102-A interfaces with the proximal end of the leg 104-B to form a separable joint 1800. The window 1802 is dimensioned and configured to receive the ledge 2002 and the slot 2004 of the leg 104-B. The leg 104-B is removably installed into the rail 102-A by inserting the ledge 2002 into the window 1802 at an angle to the upper surface of the rail 102-A. The ledge 2002 is inserted until the shoulder 2006 contacts the stop 1906. The distal end of the leg 104-B is then pivoted downward about the shoulder 2006 such that the slot 2004 receives the bearing face 1908 and corresponding side wall 1904. When installed, the mating face 2008 of the ledge 2002 contacts the inside face 1910 of the base wall 1902 of the rail 104-B and the bearing face 1908 of the window 1802 contacts the interior face 2014 of the slot 2004. The ledge 2002 is a length sufficient to fit into the window 1802 at a desired insertion angle without passing below the ends of the side walls 1904 where the rail 102-A rests on the ground.

In the illustrated embodiment, the rail 102-A is a channel. In another embodiment, the rail 102 has a rectangular cross-section and the window 1802 is a pocket formed inside the rail 102 with an inside face 1910 and an open space provided for the ledge 2002 to pivot into position. The length of the ledge 2002 is dimensioned and configured to fit into the window, or pocket, 1802 of the solid rail 102.

Figure 21:
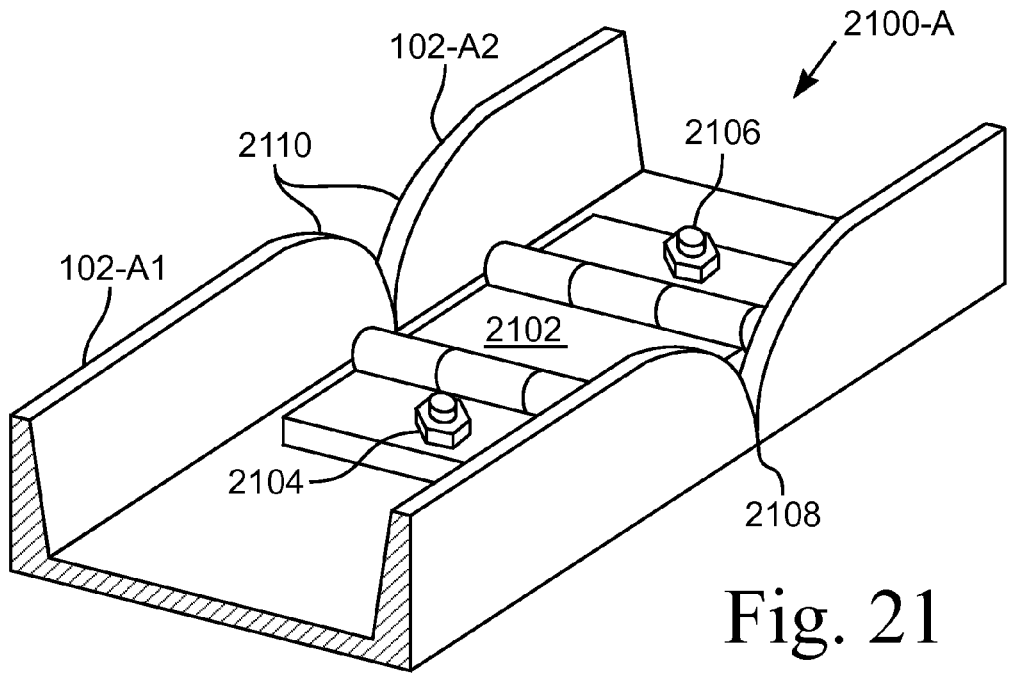
FIG. 21 is a partial perspective view of one embodiment of a connector between the rails of two weave trainers.

FIG. 21 illustrates a partial perspective view of one embodiment of a connector 2100-A between the rails 102-A1, 102-A2 of two weave trainers 100. The illustrated connector 2100-A includes a pair of rails 102-A1, 102-A2 with ends that butt together and a floating hinge 2102 that fits into the channel shaped rails 102-A1, 102-A2. The floating hinge 2102 provides for folding the rails 102-A1, 102-A2 over 180 degrees from a flat configuration with little or no gap 2108 between the parts. In the illustrated embodiment, the floating hinge 2102 is installed using threaded nuts 2104 and screws 2106. In other embodiments, the hinge is installed with other fastening devices, welds, or adhesives.

Figure 22:
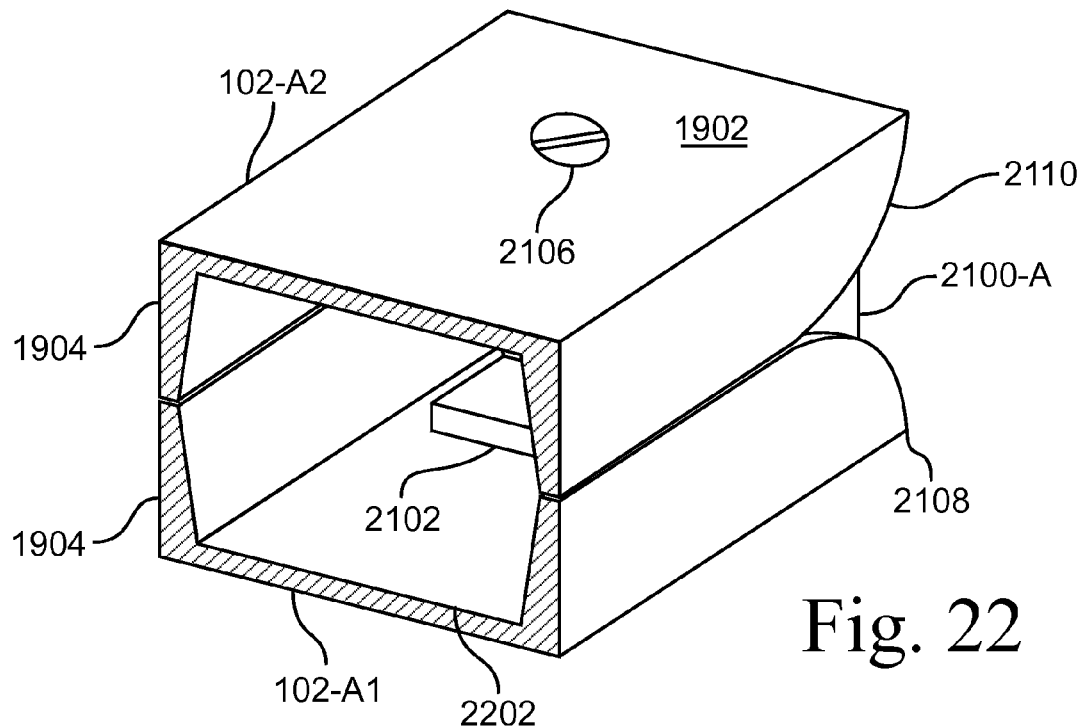
FIG. 22 is another partial perspective view of the connector shown in FIG. 21 in a folded configuration.

FIG. 22 illustrates another partial perspective view of the connector 2100-C shown in FIG. 21 in a folded configuration. When the two rails 102-A1, 102-A2 are folded together at 180 degrees from the flat configuration illustrated in FIG. 21 to the closed configuration illustrated in FIG. 22, a closed cavity 2202 is formed. The base walls 1902 form two sides of the cavity 2202 and the four side walls 1904 combine to form the other two walls of cavity 2202. The cavity 2202 provides for a storage location for the legs 104, sliders 106, or other components of the weave trainer 100.

In the illustrated embodiment, the ends 2110 of the rails 102-A1, 102-A2 are rounded. That is, the ends 2110 have a shape that allows the two rails 102-A1, 102-A2 to fold without binding. In other embodiments, the hinge 2102 is articulated such that rails 102-A1, 102-A2 with the square-cut ends do not bind when the rails 102-A1, 102-A2 are folded.

In another embodiment, the connector 2100-A is a solid bar instead of a hinge 2102. The solid bar rigidly attaches the two rails 102-A1, 102-A2 such that the rails 102-A1, 102-A2 move together as a single rigid rail 102-A.

Figure 23:
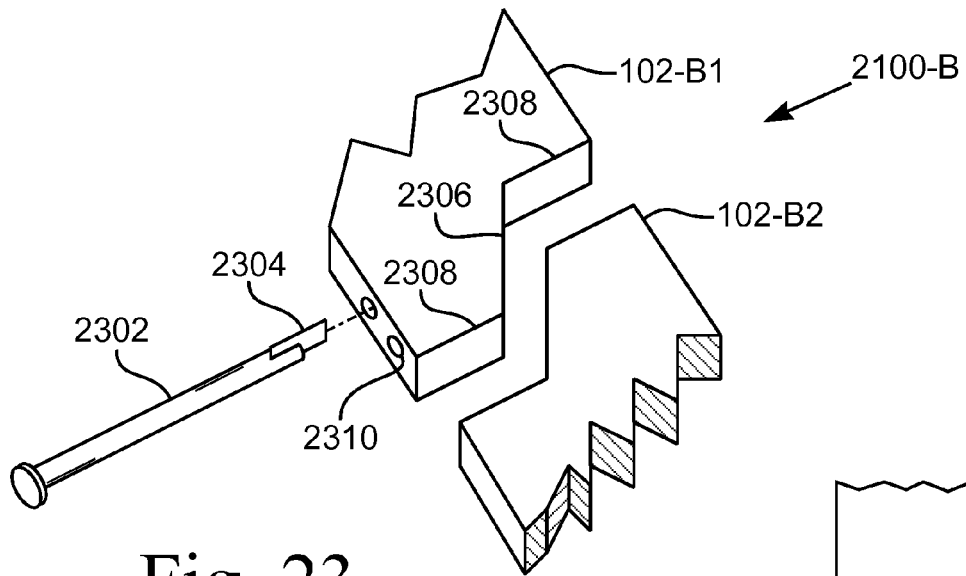
FIG. 23 is a partial perspective view of another embodiment of a connector between the rails of two weave trainers.
Figure 24:
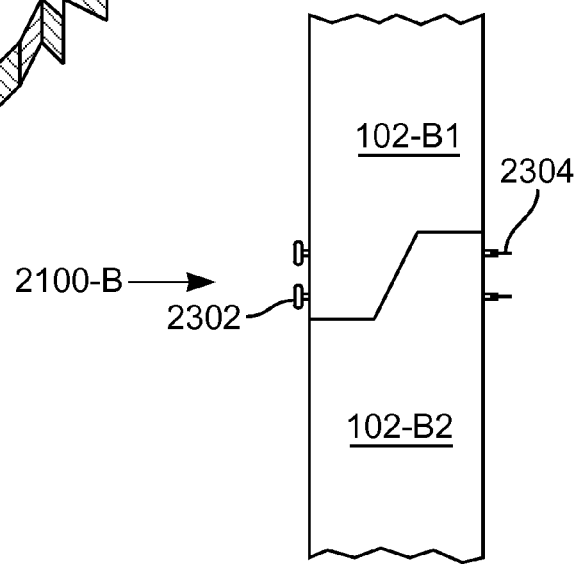
FIG. 24 is a top view of the connector shown in FIG. 23.

FIG. 23 illustrates a partial perspective view of another embodiment of a connector 2100-B between the rails 102-B1, 102-B2 of two weave trainers 100. FIG. 24 illustrates a top view of the connector 2100-B shown in FIG. 21. In one embodiment, two rails 102-B1, 102-B2 of a pair of weave trainers 100 are joined together at a connector 2100-B. The mating ends of the rails 102-B1, 102-B2 have complementary faces 2306, 2308 that mate when butted together. In the illustrated embodiment, each end has a pair of offset parallel faces 2308 that are connected with a third face 2306 near the rail centerline 110. In the illustrated embodiment, the third face 2306 is not parallel to the rail centerline 110. In another embodiment, the third face 2306 is parallel to the rail centerline 110.

When the rails 102-B1, 102-B2 are butted together, pins 2302 are inserted in corresponding holes 2310 in the rails 102-B1, 102-B2 to securely fix the rails 102-B1, 102-B2 together. In the illustrated embodiment, the pin 2302 has a toggle 2304 that rotates after passing through the hole 2310 to lock the pin 2302 in the rails 102. In other embodiments, cotter pins, clevis pins, detent pins, cotterless clevis pins, headless pins, or other fasteners are used to secure the rails 102 together.

Figure 25:
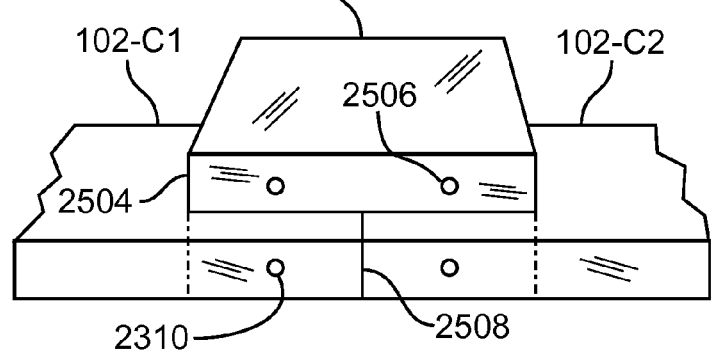
FIG. 25 is a partial side perspective view of another embodiment of a connector between the rails of two weave trainers.

FIG. 25 illustrates a partial side perspective view of another embodiment of a connector 2100-C between the rails 102-C1, 102-C2 of two weave trainers 100. The illustrated connector 2100-C includes a pair of rails 102-C1, 102-C2 with ends that butt together and a channel 2302 that fits over the ends of both rails 102-C1, 102-C2. The channel 2502 has a pair of sidewalls 2504 that fit adjacent the sides of the rails 102-C1, 102-C2. The sidewalls 2504 have holes 2506 that register with holes 2310 in the ends of the rails 102-C1, 102-C2 such that with the rails 102-C, 102-D butted together and the channel 2502 in position, pins 2302 fit in the holes 2506, 2310 to secure the rails 102-C, 102-D together.

The weave trainer 100 includes various functions. The function of providing a visual aid to an animal 202 traversing a series of poles 108 is implemented, in one embodiment, by the rail 102, which remains in place throughout the various positions of the poles 108.

The function of uniformly positioning various poles 108 is implemented, in one embodiment, by the markings 508 on the leg 104 that make known the position of the slider 106 on which the poles 108 are attached and the markings 1418 on the bearing walls 1402 that make known the angular position of the angled pole 108.

From the foregoing description, it will be recognized by those skilled in the art that a weave trainer 100 apparatus and a method of using such trainer 100 to agility train animals has been provided. In one embodiment, the weave trainer 100 includes a plurality of legs 104 that extend from a rail 102. Each leg 104 has a corresponding slider 106 that is held captive by the leg 104, but is movable along the longitudinal axis of the leg 104. Attached to each slider 106 is a peg 502 that supports a weave pole 108. In various embodiments, the sliders 106-A, 106-B include end plates 506 and stop blocks 902.

In one embodiment, the weave trainer 100' includes a plurality of pivoting mechanisms 1400. Each pivoting mechanism 1400 supports a weave pole 108' that also operates a clamp that locks the angular position of the weave pole 108'. Rotating the weave pole 108' causes a threaded stud 1410 and a collar 1406 to clamp onto an axle 1404, thereby locking the pole 108'. In one embodiment, the weave trainer 100" includes gates 1702 that provide visual and physical guidance to animals 202 traversing the weave trainer 100".

In other embodiments, the weave trainer 100 includes a hinge or connector 2100 that attaches to a second weave trainer 100. In one such embodiment, the connector is a hinge 2100-A that allows two channel-type rails 102-A to fold against each other. In another such embodiment, the connector 2100-B is a rail 102-B having an end that receives one or more pins 2302. In still another such embodiment, the connector 2100—is a channel 2502 that fits over the butted ends of two rails 102-C, and the channel 2502 is secured in place with pins or fasteners.

In one embodiment, the poles 108 are spaced approximately 21 inches apart with a rail 102 of approximately 5 feet, 3 inches in length. The rail 102 and legs 104 are ½ inch thick. The rail 102 is two inches wide and the legs 104 are ¾ inch wide and approximately 9 inches long.

The training method includes a step of positioning the sliders 106 in the extended position and having an animal 202-A follow a straight path 204-A along the rail centerline 110 of the trainer 100. This step is followed by the moving the sliders 106 toward the retracted position and having the animal 202-B follow a slightly weaving path 204-B around the poles 108. The sliders 106 are progressively moved to the fully retracted position with the animal 202-C traveling a weaving path 204-C around the poles 108.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for demonstrating the agility of an animal, said apparatus comprising:
    a rail being an elongated member with a top surface, a first side, and a second side, said rail having a longitudinal axis, said rail having a first end and a second end;
    a plurality of legs extending from said rail between said first and second ends, a first one of said plurality of legs extending from said first side of said rail proximate said first end, a second one of said plurality of legs extending from said second side of said rail at a spaced distance from said first one of said plurality of legs, others of said plurality of legs alternatingly extending from said first and second sides;
    a plurality of sliders each having a proximal end relative to said rail, each one of said plurality of sliders engaging a corresponding one of said plurality of legs, each one of said plurality of sliders movable between a first position and a second position relative to said rail, each one of said plurality of sliders sliding parallel to a longitudinal axis of said corresponding one of said plurality of legs; and
    a plurality of members each configured to attach to a weave pole substantially perpendicular to said top surface of said rail, each one of said plurality of members attached adjacent to said proximal end of a corresponding one of said plurality of sliders;
    wherein a corresponding one of said plurality of members being located over said rail when one of said plurality of sliders is in said first position.

2. The apparatus of claim 1 wherein each one of said plurality of legs and each corresponding one of said plurality of sliders includes a tongue-in-groove configuration whereby each said corresponding one of said plurality of sliders slides relative to said one of said plurality of legs.

3. The apparatus of claim 1 wherein each one of said plurality of sliders has a through-opening positioned adjacent a distal end, said through-opening dimensioned and configured to receive a stake for fixing said each one of said plurality of sliders at a selected position.

4. The apparatus of claim 1 wherein said plurality of legs are removably attachable to said rail without disassembly of said plurality of legs.

5. The apparatus of claim 1 wherein said plurality of members are tiltable wherein said corresponding weave pole is selectively positionable at an angle.

6. The apparatus of claim 1 wherein said first end of said rail is attached to a connector, said connector attached to an end of another rail.

7. The apparatus of claim 6 wherein said connector is a floating hinge, said floating hinge having an open state and a closed state, wherein said open state of said floating hinge has said longitudinal axis of said rail coaxial with a longitudinal axis of said another rail, and wherein said closed state of said floating hinge folds said rail adjacent said another rail.

8. An apparatus for demonstrating the agility of an animal whereby the animal traverses an angled weave pole arrangement, said apparatus comprising:
    a rail being an elongated member with a top surface, a first side, and a second side, said rail having a longitudinal axis, said rail having a first end and a second end;
    a plurality of legs extending from alternating sides of said rail between said first and second ends;
    a plurality of sliders each having a proximal end relative to said rail, each one of said plurality of sliders engaging a corresponding one of said plurality of legs, each one of said plurality of sliders movable between a first position and a second position relative to said rail, said first position being with said proximal end adjacent said rail; and
    a plurality of pivoting mechanisms, each one of said plurality of pivoting mechanisms attached to a corresponding one of said plurality of sliders, each one of said plurality of pivoting mechanisms having:
    an axle supported a selected distance above said top surface, said axle having a longitudinal axis;
    a clamp positioned on said axle, said clamp having a first state wherein said clamp freely rotates about said longitudinal axis of said axle, said clamp having a second state wherein said clamp is secured to said axle in a non-rotating configuration; and
    a support member attached to an operator of said clamp, said support member configured to be attached to a weave pole, said operator causing said clamp to transition between said first state and said second state.

9. The apparatus of claim 8 wherein said plurality of legs include a first one of said plurality of legs extending from said first side of said rail proximate said first end, a second one of said plurality of legs extending from said second side of said rail at a spaced distance from said first one of said plurality of legs, others of said plurality of legs alternatingly extending from first and second sides.

10. The apparatus of claim 8 wherein each one of said plurality of pivoting mechanisms is attached adjacent said proximal end of a corresponding one of said plurality of sliders.

11. The apparatus of claim 8 wherein each one of said plurality of legs and each corresponding one of said plurality of sliders includes a tongue-in-groove configuration whereby each said corresponding one of said plurality of sliders slides relative to said one of said plurality of legs.

12. The apparatus of claim 8 wherein said clamp includes a cylindrical member surrounding said axle, said cylindrical member having a threaded opening between an outside surface and an inside surface, and wherein said operator is a threaded member engaging said threaded opening in said cylindrical member, and said threaded member selectively engaging said axle.

13. The apparatus of claim 8 wherein said plurality of legs are removably attached to said rail.

14. An apparatus for demonstrating the agility of an animal whereby the animal traverses a weave pole arrangement with removably attached legs, said apparatus comprising:
    a rail being an elongated member with a top wall having a first wall and a second wall attached to opposite sides of said top wall, said rail having a longitudinal axis, said first wall and said second wall being parallel to said longitudinal axis, said rail having a first end and a second end;
    a plurality of windows spaced apart along said rail between said first and second ends, each one of said plurality of windows alternatingly positioned adjacent said first wall and said second wall, each said window including a top aperture in said top wall of said rail and an adjacent side aperture in one of said first wall and said second wall;

a plurality of legs removably attachable to said rail, each one of said plurality of legs having a proximal end configured to engage a corresponding one of said windows in said rail, each one of said proximal ends having a ledge and a slot, said ledge being dimensioned to fit into said top aperture, said ledge having an upper surface configured to be adjacent a lower surface of said top wall, said slot being dimensioned and configured to engage a portion of one of said first wall and said second wall adjacent said side aperture, each one of said plurality of legs having a top surface that is coplanar with a top surface of said top wall when said one of said plurality of legs is attached to said rail;

wherein each one of said plurality of legs includes a sliding member, said sliding member movable along a longitudinal axis of said one of said plurality of legs; and a plurality of support members, each one of said plurality of support members associated with a corresponding one of said plurality of legs and projecting upwards relative to said top surface of said corresponding one of said plurality of legs, and each one of said plurality of support members configured to support a weave pole.

15. The apparatus of claim 14 wherein each one of said plurality of legs includes a tongue-in-groove configuration whereby each said corresponding one of said plurality of legs telescopes along its longitudinal axis.

16. The apparatus of claim 14 wherein a corresponding one of said plurality of support members is attached proximate to a proximal end of said sliding member.

17. The apparatus of claim 16 wherein each said support member is a pivoting member wherein said corresponding weave pole is selectively positionable at an angle.

* * * * *